March 12, 1940.  J. McGAVACK  2,192,980
RUBBER INSULATED ELECTRICAL CONDUCTOR
Filed Sept. 10, 1931
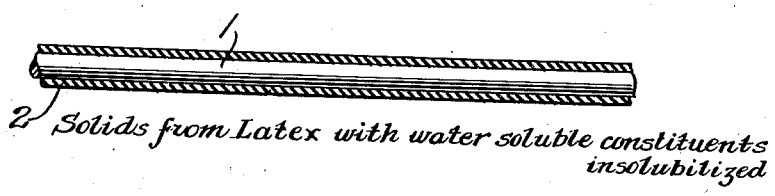
INVENTOR
JOHN McGAVACK
BY
ATTORNEY Patented Mar. 12, 1940

2,192,980

UNITED STATES PATENT OFFICE 2,192,980

RUBBER INSULATED ELECTRICAL CONDUCTOR

John McGavack, Leonia, N. J., assignor, by mesne assignments, to United States Rubber Company, New York, N. Y., a corporation of New Jersey Application September 10, 1931, Serial No. 562,202

4 Claims. (Cl. 174—125)

This invention relates to methods of improving electrical insulation more especially insulation deposited from aqueous dispersions of rubber, and the products produced thereby.

The insulation of electrical conductors directly from latex has long since been suggested. The British patent to Siemen No. 484 of 1863 discusses the insulation of telegraph wires by preferably first covering the wire or strands of wire with a layer of fibrous material, and then passing the conductor through a latex bath and drying the adhered coating and repeating the operations until the desired thickness of insulation has been obtained. The disadvantage of such a process for insulating wire is that deposits of rubber from a latex dispersion are more or less moisture absorbent and have poor insulating qualities, especially when wet. The copending application of Harold D. Rice Ser. No. 555,209 filed Aug. 5, 1931, which has matured into Patent No. 1,936,994 of November 28, 1933, describes and claims improvements in the water resisting and electrical insulation properties of rubber insulations deposited from latex by first purifying the latex as by creaming with the aid of creaming agents or centrifuging in order to remove a large amount of the non-rubber constituents to which much of the inferior properties of this type of electrical insulation are due.

The present invention relates to improving the water resisting and electrical insulation properties of rubber insulation deposited directly from aqueous dispersions of rubber. The present invention is applicable to various aqueous dispersions of rubber such as natural latex, artificial dispersion, purified latices, and rubber dispersions which may or may not contain vulcanizing ingredients or which may be prevulcanized in a manner well known in the art, and which also may contain desired fillers or compounding ingredients.

I have found that there is a great improvement in the water resisting and electrical insulation properties of electrical insulation deposited from aqueous dispersions of rubber if the normally water soluble constituents of the finished insulation are insolubilized, even in the case of the small amount of water-solubles that may be present in insulation derived from a purified latex composition. I have further found that the improvement in the water resisting and electrical insulation properties of such electrical insulation may be even further improved if in addition to insolubilizing the normally water-soluble ingredients in the insulation derived from an aqueous dispersion of rubber an insoluble metallic soap is also formed in the rubber insulation. The normally water-soluble ingredients of the rubber insulation may be insolubilized at the same time any soluble soaps that may be present are insolubilized. Such soluble soaps may be naturally occurring in a latex composition used as an insulation, or they may have been added to a latex composition during compounding as a protective agent, for example; such soluble soaps in an insulation derived from an artificial latex may have had their origin as a protective colloid in the preparation of the dispersion; or such soaps may have been added to the rubber dispersion expressly for the purpose of forming an insoluble metallic soap in the insulation.

In the drawing 1 represents an electrical conductor covered with an insulation 2 of the in-situ deposit of solids from an aqueous dispersion of rubber treated according to the present invention.

In one method of carrying out my invention, an electrical conductor, which may be solid, stranded, bare, tinned, served with fibrous material, or wrapped with paper in a manner well known in the art, is passed into and through an aqueous dispersion of rubber which may be compounded as desired, and as the conductor leaves the bath with the adhering film of dispersion on it, it is passed through a soap solution which may be of approximately 4% strength, or more or less if desired, and the film is then thoroughly dried. After the film of rubber is thoroughly dried, it is passed through a solution of a material which is adapted to insolubilize water-soluble ingredients in the film and also to insolubilize the added soap. I have found that 5% to 10% solutions of soluble salts of metals form insoluble soaps with the more common fatty acids very satisfactorily, although other strengths of solution may be employed. I have found that soluble salts, such as the acetates of metals such as magnesium, aluminum, calcium, zinc, lead, mercury, cadmium, cerium, zirconium, and lanthanum are excellent insolubilizing agents. Soluble salts of other acids, such as the nitrates and chlorides, may be used but the acetates appear most desirable since on heating these salts the acetic acid is broken off and volatilizes, thus removing a water soluble constituent that might otherwise be present especially where an excess of the salt has been used. The treatment may be repeated until an insulation of the desired thickness has been obtained and then dried and the insulation vulcanized if desired. By this method the insoluble metal soaps and insolubilized water-soluble ingredients are formed more especially at the surface of the insulation due of course to the surface treatment with soap and the metal salt solution. The treatment with soap solution may be omitted and if no soluble soaps are present in the dispersion the normally water-soluble ingredients such as are present in natural latex will be insolubilized. If soluble soaps are present in the dispersion, such will be insolubilized, especially at the surface, by the salt treatment of the deposited rubber film without a prior treatment with soap solution.

In another method of carrying out my invention, which is more applicable to fibre covered conductors than to bare or tinned conductors, the conductor is first passed through a solution of a water soluble salt, for example a 10% acetate solution, of one or more of the metals such as magnesium, aluminum, calcium, zinc, lead, mercury, cadmium, cerium, zirconium, lanthanum, as described above, which form insoluble soaps with the more common fatty acids. Of course, other concentrations and other soluble salts of such metals may be used. The conductor with the fibre covering thus impregnated with the salt is properly drained and then introduced into the rubber dispersion, which preferably takes the form of a purified latex such as latex that has been creamed with the aid of creaming agents and/or centrifuging in a manner well known in the art. The conductor may be reintroduced into the salt solution and back into the latex again as many times as necessary to obtain the desired thickness of insulation. The salts in this case perform a two-fold function;—first, they form insoluble compounds with the water-soluble constituents of the dispersion, such as forming insoluble salts with the proteins and insoluble soaps with resin acids normally occurring in latex, and also they form insoluble compounds with substances such as soluble soaps that may be added in the manufacture or compounding of the dispersion, or in the creaming of the latex composition, thus making the insulation more water proof and giving it better electrical insulation properties, and secondly, due to the charge and destabilizing ability they increase the amount of rubber deposited on the conductor over the amount that could be obtained by merely passing the untreated conductor throughout the same dispersion without the prior salt treatment.

The following table shows the effect of dipping a cotton covered conductor in a solution of various salts before dipping in a latex once creamed with creaming agent and having 25% solids. The columns show the treatment, the gauge of the coated dry wire, the number of dips, and the breakdown voltage after such a sample had been exposed to water for a period of one hour.

| Test No. | Salt used 10% solution | Gauge of coated wire | Dips | Breakdown in volts after 1 hour in water |
|---|---|---|---|---|
| 1 | None | .046 | 1 | 0 |
| 2 | Magnesium acetate | .048 | 1 | 800 |
| 3 | Calcium acetate | .049 | 1 | 1000 |
| 4 | do | .049 | 1 | 1150 |
| 5 | Cerium acetate | .048 | 1 | 1400 |
| 6 | Zirconium acetate (5%) | .049 | 1 | 1150 |
| 7 | Cadium acetate | .048 | 1 | 900 |
| 8 | Calcium acetate | .060 | 2 | 2600 |
| 9 | do | .065 | 2 | 3500 |
| 10 | None | | 2 | 1800 |

NOTE.—The latex in No. 9 test contained a small amount of soap.

It can readily be seen from examination of this table that while one coat of creamed latex practically has no electrical strength after one hour's exposure to water, a similar cotton covered wire, when first treated with a solution of one of the salts mentioned, has a breakdown voltage of from 800 to 1400 volts after one hour's exposure to water. It can also be seen that where more than one coat is applied on the same wire, a further marked improvement in the electrical strength is obtained, and also that a soluble soap in the coating insolubilized by the salt treatment may also further increase the electrical strength of the insulation.

While the invention has been described more or less in detail, it is not intended thereby to so limit the invention, inasmuch as the examples herein set forth are merely illustrative thereof and various modifications may be made without departing from the invention, the scope of which is indicated in the following claims.

Having thus described my invention, what I claim and desire to protect by Letters Patent is:

1. An electrical conductor insulated with an in-situ deposit of solids from a purified latex, said deposit including the water-insoluble reaction product of a metallic salt and at least some of the normally water-soluble ingredients of said deposit naturally occurring in the latex.

2. An electrical conductor insulated with an in-situ deposit of solids from a purified latex, said deposit including an in-situ deposit of a water-insoluble metallic soap.

3. An electrical conductor insulated with an in-situ deposit of solids from a purified latex, said deposit including a water-insoluble metallic soap of resin acids naturally occurring in the latex.

4. An electrical conductor insulated with an in-situ deposit of solids from purified latex, said deposit including a water-insoluble metallic salt of proteins naturally occurring in the latex.

JOHN McGAVACK.